Figure 1:
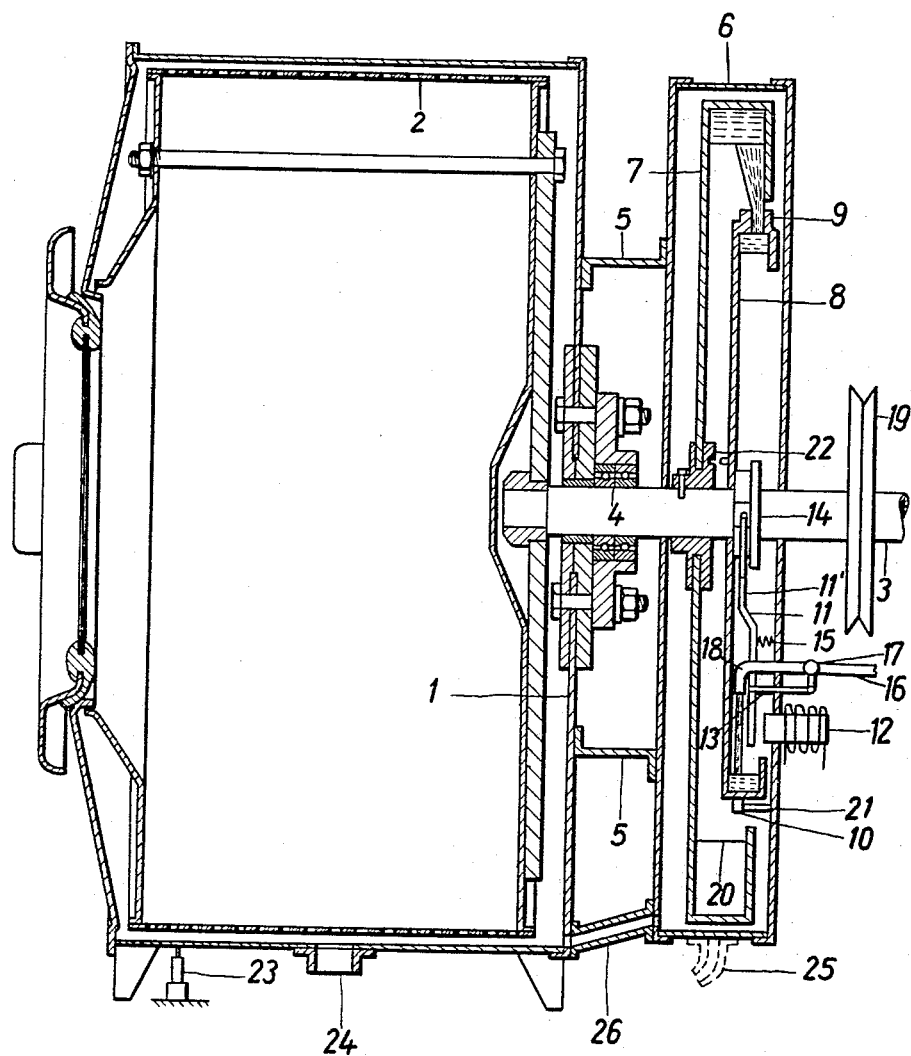

July 11, 1967  L. M. KAHN  3,330,168
BALANCING SYSTEMS FOR EXTRACTORS, PARTICULARLY
WASHING OR CLEANING MACHINES
Filed July 28, 1965  4 Sheets-Sheet 3

Inventor:
LEO M. KAHN
BY Bert Lewen
ATTORNEY

United States Patent Office 3,330,168
Patented July 11, 1967

3,330,168
BALANCING SYSTEMS FOR EXTRACTORS, PARTICULARLY WASHING OR CLEANING MACHINES
Leo M. Kahn, 536 79th St., Brooklyn, N.Y. 11209
Filed July 28, 1965, Ser. No. 475,519
15 Claims. (Cl. 74—573)

The present invention relates to a balancing system for an extractor, particularly for a washing or cleaning machine having a perforated cylinder for containing articles to be washed or cleaned mounted for rotation on a driving shaft which can also be rotated at a high speed for extraction, the cylinder being enclosed by an outer shell provided with a door for loading the articles into the cylinder and means for admitting a washing or cleaning liquid thereinto. Such machines will hereinafter be referred to as "of the kind described."

During operation, machines of the kind described, are liable to vibration at high speeds due to out-of-balance of the load, either due to the load being unevenly distributed or to the load changing with extraction of the washing fluid from the articles. Hitherto it has been usual to mount a balancing arrangement in or on the cylinder within the outer shell. In the former case, the balancing arrangement, which may take the form of pockets to which a balancing fluid is admitted, takes up a great deal of space which otherwise could be occupied by the articles to be washed or cleaned.

It is an object of the present invention to provide a balancing system which allows the maximum amount of articles to be loaded into the cylinder and which nevertheless provides a satisfactory balancing action.

The invention provides a solution of the cited problem and suggests a machine having the balancing means mounted on the driving shaft outside the wash receiving drum. The invention is characterized by an annular housing co-axial in relation to a drum being rotatable in said housing with the drum and comprising a U-shaped channel member open in a radially inward direction and being divided into a plurality of compartments; the arrangement being characterized further by a single pick-up ring co-axial in relation to the drum having a duct leading to said pick-up ring, said duct being adapted to inject balancing flowable material into one of said compartments opposite the imbalance of said body.

Since the balancing arrangement according to the invention is not mounted within the cylinder, it will be apparent that all the available space is taken up by the articles to be washed or cleaned. Moreover, where the balancing arrangement according to the invention is to be mounted outside the shell, it can be manufactured as a separate item whereby it may be fitted to existing machines having no balancing arrangements whatsoever. In addition, the balancing arrangement according to the invention allows the machine to operate about either a horizontal or a vertical drive axis, and allows ready access for servicing.

In one convenient embodiment, the balancing in the arrangement according to the invention is effected by the admission of a flowable counter-balancing material such as mercury, water, cleaning fluid or discrete particles, e.g., of sand, to an annular housing arranged on and rotatable with the driving shaft outside the outer shell that surrounds the perforated cylinder. This annular housing may comprise a backplate to which is secured a U-shaped channel member which is open in the radially inwards direction, i.e., towards the driving shaft. The channel member is subdivided into a plurality of compartments, generally three or more, by radial fins of a length less than the radial width of the channel member. A hollow inlet tube of any desired length and containing a supply valve at any convenient point in its length, is directed towards and debouches into a second annual housing, hereinafter referred to as a "pick-up ring," located within the first annular housing. This pick-up ring is mounted, e.g., on a shaft, to rotate independently of the first annular housing, and projecting radially outwardly from the ring is a hollow duct or pipe to extend towards the first annular housing so as to inject balancing material into one or more of its compartments. The pick-up ring may be mounted on a hub arranged on a shaft, or in any other convenient way so as to be rotatable loosely with respect to said first annular housing. Axially between the driving shaft and the supply tube is an electromagnetic clutch device. One member of this clutch is divided into a plurality of segments which are individually magnetisable by suitably located coils or the like from an external electric supply system controlled by the balancing arrangement, and the other comprises a magnetic part which can be entrained by the segment of the first member which is selectively energised. If the driving shaft has a sufficiently large diameter, one of the members of the clutch may be constituted by the surface of the end of the shaft.

In order to detect an out-of-balance condition a microswitch or similar device is located adjacent the washing machine shell or support legs therefor so that if vibration occurs the microswitch will be closed to operate for example a solenoid to open the balancing material supply valve on the inlet tube. However, in series with the microswitch or the like is the electrical supply system to the magnetising coils on the segments. The segments correspond in position with various regions of the cylinder so that when an out-of-balance condition occurs the segment appropriate to the out-of-balance area will be energised to cause it to clutch with the magnetic part of the other member of the clutch, thus locking the rotatable hollow duct into the appropriate position to admit balancing fluid to one of the compartments of the channel member opposite the out-of-balance load position. The hollow duct may normally hang downwardly by gravity and turn only when the detecting device controls its movement.

If there is a change in the out-of-balance position during extraction, the switching arrangement may be such that upon the initiation of a new out-of-balance control signal, the magnetic clutch is first de-energised so that the hollow duct is freed from its previously held position and can be moved to the appropriate position to inject water into the first annular housing. For this purpose there may be an electromagnetically dead space between the segments. A slip ring is provided in conjunction with a movable finger or brush to allow a switch impulse from the micro-switch or the like to be mounted to control the correct segment. The out-of-balance detecting means may also be similar to that described in the earlier patents of the present applicant.

The material injected into the first annular housing is retained therein under centrifugal action, since said housing rotates at a high speed with the rotation of the cylinder.

If the first compartment into which the balancing material is first ejected is not large enough to effect counterbalance, then the balancing material can transfer or overflow from one compartment to the next while the machine is rotating until balancing is achieved, by the circumferential spread of the balancing material. If for any reason there is a change in the out-of-balance position, which can easily happen during operation, and consequently operates the micro-switch or the like in a new position, and this will effect the energisation of the electromagnetic system into a new position to allow altering of the position of the hollow duct to inject material into the proper compartment. It will be apparent that the larger the number of segments and compartments, the more accurate will be the compensation.

During operation of the extraction cycle, the articles and their absorbed fluid will become progressively lighter and what was originally the heavy position will then become lighter due to more fluid being extracted and in itself will tend to change the out-of-balance position, to effect compensation as referred to above.

In the embodiment described above, the balancing arrangement of first annular housing, pick-up ring and associated components is located outside the outer shell of the machine. The arrangement may be close to or spaced from the shell whereby the drive means for the shaft may be axially beyond the balancing arrangement or between the arrangement and the shell, respectively. However, if desired, the balancing arrangement may be located within the shell but still outside the cylinder. In prior balancing arrangements described in previous patent specifications in the name of L. M. Kahn and C. Bernstein, use is made of pockets for containing balancing fluid which, or some of which, constitute hollow ribs or tanks arranged in the cylinder and shaped in such a manner as also to serve as beaters i.e. devices to lift and drop the articles to be washed or cleaned: however, since these perform such dual functions, they are larger than would be necessary for effecting merely the lifting and dropping action. With the arrangement according to the invention however, the first annular housing referred to may have the same diameter as or even be larger than the cylinder, so that less balancing material is required because the larger diameter of the housing allows the centrifugal force available to be increased. The said first annular housing may be located between the washing cylinder and the drive shaft bearing in the outer shell, which thus locates the balancing arrangement nearer the articles that cause the out-of-balance than if the balancing arrangement is outside the outer shell, whereby any dynamic out-of-balance due to the balancing arrangement itself is greatly minimised.

In the prior arrangements where the counter-balancing fluid is supplied to internal pockets acting as beater ribs, the centrifugal force effect may be smaller than in the arrangement of the invention, due to the difference in diameter of the balancing-fluid containing means. The invention also allows the beater ribs necessarily provided within the cylinder to be of the correct shape and size since they now have to perform only one function.

In order to empty the balancing material from the machine housing when the machine is slowed to a stop after each extraction cycle, the hub may have on its outside a conically-shaped member which will not interfere with the hollow drive, provided with balancing material-directing ribs or grooves to allow the balancing material spilled inwardly from the first annular housing to be directed into a surrounding casing from which it can be delivered into the shell of the washing machine. Alternatively, if the balancing material is not the same kind as the washing or cleaning fluid, said casing may have a separate outlet leading to a separate supply and then to allow circulation through the supply valve.

If desired, the outer shell of the balancing arrangement may be connected to a suitable means for supplying air and/or heat to the articles, particularly after or during extraction of the washing or cleaning fluid by spinning and recycling. The balancing means assembly also operates as a fan.

While a particular embodiment has been described it will be understood that various modifications may be made without departing from the scope of the invention. For example, the balancing material may be fed to the balancing compartments through separate pipes, e.g. a minimum of three pipes, permanently rotating with the housing, the discharge of the balancing material through these pipes being controlled by separate mechanical valves actuated in accordance with the out-of-balance detecting means.

Figure 2:
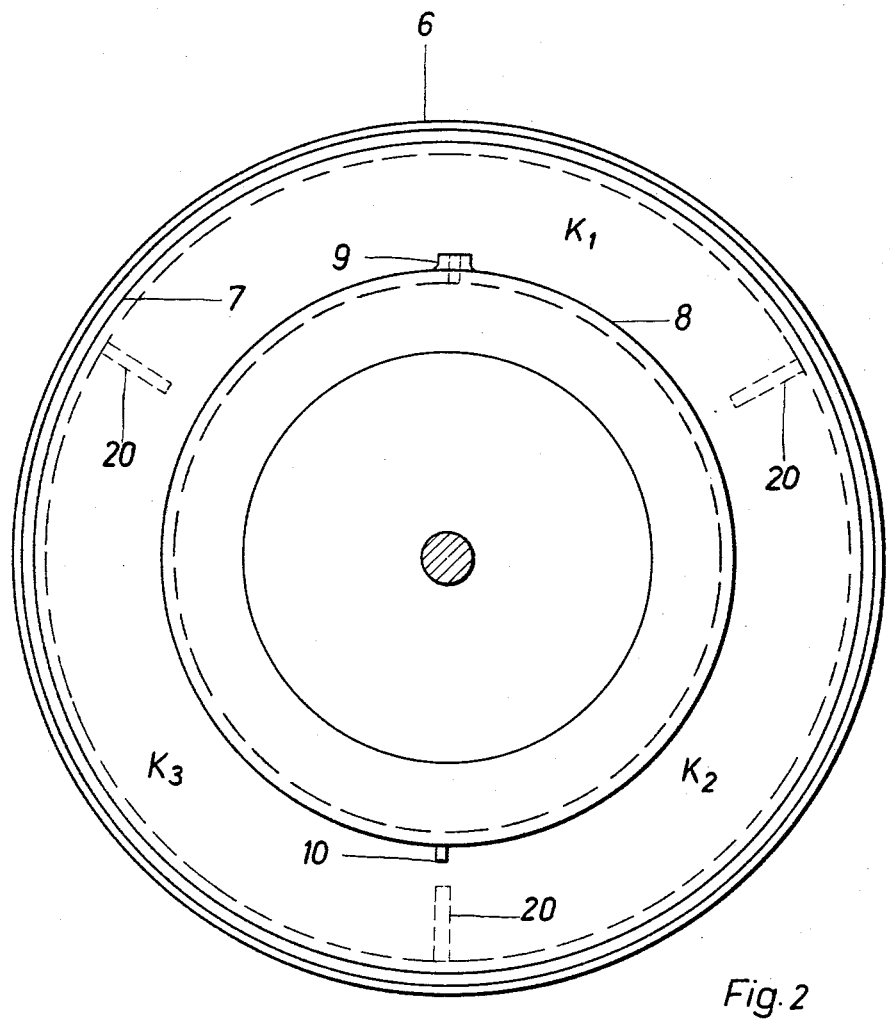
Figure 3:
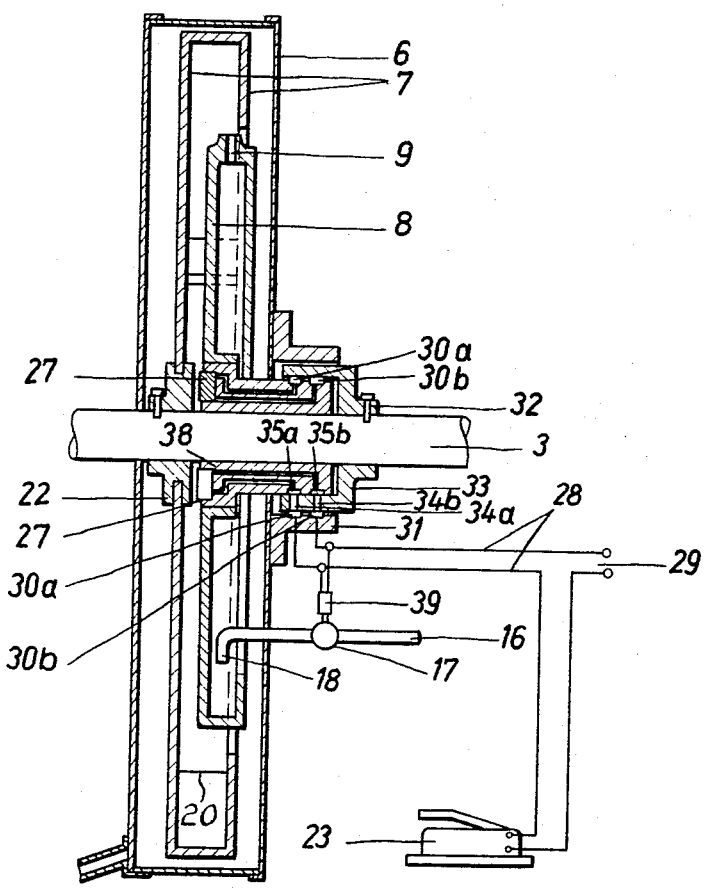
Figure 4:
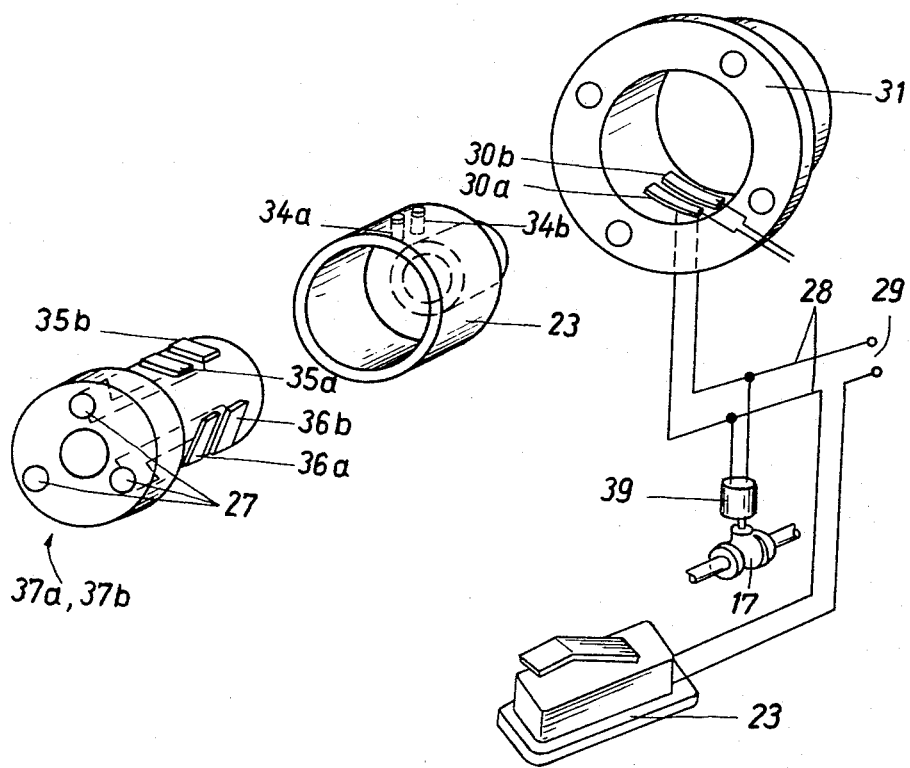

The invention is described referring to the annexed drawings. Herein shows:

FIG. 1: a vertical section through a washing machine having a horizontal drum shaft and a balancing arrangement outside of the machine shell;

FIG. 2: a front view of the machine of FIGURE 1;

FIG. 3: a further embodiment showing the balancing arrangement in vertical sectional view;

FIG. 4: the arrangement of control contacts on the rotating elements on the shell, the drum shaft and the clutch.

In FIG. 1 the shell of the washing machine is designed by reference number 1. The shell surrounds a drum 2 being rotated around a horizontal axis. The drum is perforated. The space surrounded by the drum 2 and being open at the front side is accessible through a door which is arranged and sealed in a well-known manner. The clothes to be cleaned are fed through the side door into the drum, and withdrawn therethrough after cleaning.

The drum 2 is mounted on a horizontal shaft 3 which is rotatably supported by the bearing 4 which passes through the back wall of the shell. Mounted to the back wall of the shell 1 by means of connection members 5 is another housing 6 wherein the balancing means is contained. The housing 6 is circular and has substantially the same diameter as the shell 1. Inside the housing 6 is an annular housing 7 which is attached to the shaft 3. The annular housing comprises a disc laying in a plane normal to the shaft 3 and having a flange concentrical to the shaft 3 around its periphery and being deflected again towards the shaft at its free end, whereby a U-shaped channel member, open in a radially inward direction, is formed. This member is divided, as can be seen from FIG. 2, into compartments $K_1$, $K_2$ and $K_3$ by means of radially separating walls 20 (in the embodiment as shown there are three separating walls and therefore three compartments provided).

Within the annular housing 7 a pick-up ring 8, coaxially mounted in relation to the drum and having a smaller diameter than the housing 7, is freely mounted on the shaft 3. The pick-up ring can be connected to the shaft 3 by means of a coupling means. The pick-up ring 8, in cross-section, corresponds substantially to the U-shaped annular housing 7. It is smaller than the housing 7. On the periphery of the pick-up ring 8 is a radial opening or duct, which is directed towards the U-shaped member on housing 7, and an abutment 10 at a location diametrally opposite to the position of opening 9. Mounted on the outer shell 6 of the machine is a fixed abutment 21. The abutments 10 and 21 are arranged such that the opening 9 is positioned at the highest point of the periphery of the pick-up ring 8 when the abutments 10 and 21 contact one another.

The clutching means which serves to connect the pick-up ring 8 with the shaft 3 is engaged and disengaged by an arm which latter is in engagement with that half of the clutch which is affixed to pick-up ring 8. The other half of the clutch means is formed by a rim 22 rigidly connected to the shaft 3 and supporting the annular housing 7.

The arm 11 which is swingably mounted at 11′, brings the clutch assembly 14 and 22 into the closed position, when a solenoid 12 is actuated. The clutch means is moved back into open position by a spring 15 which is provided between the arm 11 and the wall of the shell 6. When clutching or declutching operation is effected, the pick-up ring 8 is moved axially. The opening 9, however, remains within the annular chamber is formed by the U-shaped member on the housing 7.

The axial movement of the pick-up ring 8 is limited in relation to the width of the U-shaped member on its periphery such that a water inlet duct 16 with its nozzle 18 remains within the U-shaped member in any position of the pick-up ring 8. The duct 16 is controlled by a valve 17 and the opening and closing movements thereof are synchronized with the movements of the clutch means. For this purpose a connecting rod 13 is arranged between the arm 11 and the control member of the valve 17.

The shaft 3 and the drum 2 are driven by means of a pulley 19, the driving means being completed in any well-known manner by a cone belt and an electric motor (not shown). For removing the balancing fluid from the housing 6, a connecting duct 26 is provided which leads into the interior of the shell 1. At the lowest point of the shell 1 there is a depression 24. Below the lowest point of the shell 1 a stationary micro-switch 23 is mounted. This micro-switch actuates the solenoid 12 and thereby the clutch means and the feeding of the balancing fluid as controlled by valve 17. The shell 1, due to the imbalance, actuates the micro-switch, as will be described below. If the balancing fluid is a fluid different from the washing liquid, the connecting duct 26 is omitted and the housing 6 is provided with a separate outlet 25. In the first case, the depression 24 and, in the second case, the outlet 25 may be connected with the inlet duct 16 by means of a pump.

In FIG. 3 another embodiment of clutch means arranged between the pick-up ring 8 and the shaft 3 is shown. The figure shows an electromagnetic clutch means, the two halves of which are held together by magnetic action. One clutch half comprises the rim 22, firmly connected with the annular housing 7 and rotatable with the shaft 3, as this was described in connection with FIGURE 1, while the other half of the clutch supports the electromgnets 27 mounted 120° apart from each other. The half of the clutch supporting the electromagnets 27 is freely rotatable on the shaft 3 when the clutch is open, and rigidly connected to the pick-up ring 8. The current is supplied to the electromagnets 27 from a source 29 by conduits 28 which are connected to two sliding contacts 30a and 30b, as is shown in FIGURE 4. The contacts 30a and 30b are mounted in a ring 31, which is rigidly mounted on the shall 6. In said ring 31, a sleeve 33, connected to the shaft 3, is rotatable. Each of the sliding contacts 30a and 30b extends in peripheral direction for a limited arc. The sleeve 33, rotating with the shaft 3 within the ring 31, comprises two contact studs 34a and 34b which touch the contacts 30a and 30b. The contact studs 34a and 34b pass through the sleeve 33 and slide at its inside ends along pairs of segment-like sliding contacts 35a, 35b; 36a, 36b; and 37a, 37b. One of the electromagnets 27 is connected to one of said contact pairs. The pairs of the sliding contacts are provided at the periphery of the clutch half 38, which is mounted on a shaft 3 and sleeve-like in form. The electromagnets 27 are located at the front side of the said clutch half 38. The pairs of sliding contacts in peripheral direction are separated electromagnets such that they are not shorted together. Upon closing of the micro-switch 23 the appropriate electromagnet 27 is excited and the clutch 22, 27 is closed. The clutch is closed only when the imbalance passes the micro-switch 23 and, simultaneously, the position of the sleeve 33 is such that the contact studs 34a and 34b provide for an electric connection between the sliding contacts 30a, 30b and one of the contact pairs. The pick-up ring 8 is appropriately positioned to inject balancing fluid into the correct compartment, by means of the alignment of the energized electromagnet and the magnetic part of the rim 22.

According to the previous embodiment, the duct 16 for the balancing fluid has a nozzle 18 for injecting fluid into pick-up ring 8. The valve 17 in the duct 16 is opened or closed with the aid of a solenoid 39 in synchronism with the clutch 22, 27.

The operation of the arrangement according to the invention is as follows:

The U-shaped housing, fixed to the shaft of the drum and having in diameter substantially corresponding to that of the drum itself, comprises three or more compartments open in a radially inward direction. Each of the said compartments is sufficiently large to hold the amount of water necessary for balancing out the greatest possible inbalance.

As noted previously, the pick-up ringht 8 is rotatably mounted on the shaft and when the clutch is opened, as shown in FIGURE 1 which illustrates the mechanical clutch, remains in a fixed starting position by virtue of abutments 10 and 21. The micro-switch, located at the bottom surface of the drum, is actuated when it is struck by the so-called "heavy side," i.e., the side of the drum where the weight concentration of clothing is the greatest. When the micro-switch closes, the clutch is immediately engaged, thereby positioning the outlet duct 9 towards the compartment of the housing 7 diametrically opposed to the "heavy side." Simultaneously, balancing fluid is injected into the pick-up ring 8, via nozzle 18.

The clutch remains closed and the feeding of the water is continued as long as the micro-switch 23 is actuated by the imbalance. As soon as sufficient water for balancing the drum has been transferred into the annular housing, the vibrations caused by the imbalance cease and the clutch is opened again. The feeding of the water is stopped, since the valve in the feeding conduit and the clutch means are linked together. It is advisable to discontinue the power to the drum during the balancing operation and to allow the drum to coast until it is perfectly balanced. This latter measure protects the machine against break-down because the power remains disconnected as long as imbalances appear, e.g., if the water supply does not work, the drum will eventually stop.

If the heavy side of the drum, as caused by the presence of wet clothings, becomes lighter more water is supplied to the pick-up ring 8 in order to equalize the system. Between the water filled compartments bleeders are provided to help keep the system in balance as the water is extracted from the clothing.

The clutch can be constructed in several ways. It is possible to provide one clutch surface on the plane side of the ring 8, normal to the shaft, or to make the ring 8 slidable in an axial direction the annular housing 7 can be slidably mounted. The said housing is non rotatably mounted on the shaft 3 by providing suitable keys.

In the embodiment according to FIGURES 3 and 4 no mechanical positioning means is needed for maintaining the pick-up ring 8 in its starting position. A rotatable half of the clutch is provided with three or more segments embodying electromagnets. This half of the clutch is brought into engagement with a second half of the clutch being fixedly mounted on the shaft. The current is supplied by means of a sliding ring, passing the current when the micro-switch is actuated by the vibrations of the drum, such that one of the electromagnets is energized.

Having thus described my invention, what I claim and desire to protect by Letters Patent is:

1. A balancing arrangement adapted to bring into balance a body subject to imbalance and rotating about a drive shaft which comprises: an annular housing rotatable in relation to said drive shaft having a U-shaped channel member open in a radially inward direction and being divided into a plurality of compartments; a second annular housing having a duct on the outer portion thereof; and means adapted to position said duct to permit the injection of balancing material into one of said compartments opposite the imbalance of said body.

2. A balancing arrangement adapted to bring into balance a body subject to imbalance and rotating about a drive shaft which comprises: an annular housing rotatable in relation to said drive shaft and having a U-shaped channel member open in the radially inward direction and being divided into a plurality of compartments; a balancing material pick-up ring having a U-shaped annular channel member having a duct on the outer portion thereof, said pick-up ring being freely mounted on said drive shaft and positioned so as to permit the injection of balancing material through said duct into said compartments of said annular housing; coupling means for engaging said pick-up means, said coupling means being adapted to position said duct in relation to one of said compartments depending on the position of the imbalance of said body and to rotate said pick-up means at the same rate as said annular housing.

3. A balancing arrangement adapted to correct an imbalance in a washing cylinder or the like subject to high speed rotation, said washing cylinder being supported and revolved about a drive shaft, which comprises: an annular housing rotatable in relation to said drive shaft having a U-shaped channel member open in the radially inward direction and having a plurality of compartments separated by radial fins; a balancing material pick-up ring freely disposed about said drive shaft and having a U-shaped annular housing and a duct adapted to inject balancing fluid into one of said compartments in said annular housing; balancing fluid inlet means for injecting fluid into said pick-up means; valve means for controlling the passage of fluid through said inlet means; clutch means for engaging said pick-up ring to permit rotation at the same rate as said annular housing; positioning means adapted to locate the duct in said pick-up ring adjacent to one of said compartments upon the engagement of said clutch means; vibration sensing means to determine and locate the imbalance; and connecting means from said vibration sensing means to said positioning means, clutch means and said valve means for positioning said duct adjacent to the compartment opposite to said imbalance, engaging said pick-up ring, and permitting the flow of balancing fluid, so as to bring said washing cylinder and balancing arrangement into balance axially about said drive shaft.

4. The balancing arrangement of claim 3 wherein one half of said clutch is composed of a plurality of selectively magnetic segments and the other half of a single paramagnetic segment, said segments acting as said positioning means; and said connecting means serving to bring the two halves of said clutch into contact with one another.

5. The balancing arrangement of claim 3 wherein said positioning means comprises: a key and a plurality of mechanical stops each of which may be actuated to engage said key so as to position said pick-up ring in respect to said annular housing.

6. The balancing arrangement of claim 2 wherein said pick-up ring is maintained at a fixed predetermined position prior to engagement of said coupling means and wherein said coupling means are engaged when the point of imbalance of said body passes a fixed point, said predetermined position and fixed point being such that said duct is located to inject balancing fluid into the compartment of said annular housing opposite said point of imbalance.

7. The balancing arrangement of claim 2 wherein the coupling means comprises an indenture and a key adapted to engage said indenture, one of which is located on a surface rotating in relation to said shaft and the other in fixed relation to said pick-up ring and means for engaging and disengaging said key and indenture by moving said pick-up means axially in relation to said drive shaft.

8. A balancing arrangement according to claim 7 characterized in that the indenture fixed to said pick-up ring and forming a locking means comprises a solenoid having its core fixed to said ring.

9. A balancing arrangement according to claim 2 characterized in that the coupling means comprises an indentation and a key provided for engagement with said indentation whereby one of the said elements is fixed on a surface connected with the shaft or the ring and being rotatable herewith whereas the second of said elements is fixed to a surface stationary in relation to said shaft or ring, whereby means are provided for engaging and disengaging the key with the indentation by axial sliding movement of the ring on the drive shaft.

10. A balancing arrangement according to claim 2 characterized in that the annular housing and the ring are located inside of the shell of the machine surrounding the drum but outside of said drum.

11. A balancing arrangement according to claim 2 characterized in that the annular housing and the ring are mounted outside of the shell of the machine on the drum shaft penetrating the wall of said shell of the machine.

12. A balancing arrangement according to claim 2 characterized in that the annular housing and the ring are surrounded by a further housing fixed to the outside wall of the shell of the machine.

13. A balancing arrangement according to claim 2 characterized in that the annular housing and the ring are arranged with an all-round closed housing fixed to the shell of the machine.

14. A balancing arrangement according to claim 3 characterized in that the vibration sensing means is located between the housing swingably mounted in the machine frame and the machine frame itself.

15. A balancing arrangement according to claim 3 characterized in that the vibration sensing means is mounted on a fixed surface separated from the machine within the reach of the drum, for instance on the bottom.

References Cited
UNITED STATES PATENTS 2,717,698   9/1955   Armstrong _____ 74—573

FRED C. MATTERN, Jr., *Primary Examiner.*

W. S. RATLIFF, *Assistant Examiner.*